United States Patent Office 3,271,398
Patented Sept. 6, 1966

3,271,398
OROTIC ACID SALT OF 4-AMINO-5-IMIDAZOLECARBOXAMIDE
Raitaro Haraoka, Osaka, and Takashi Kamiya, Toyanaka, Japan, assignors to Fujisawa Pharmaceutical Co., Ltd., Osaka, Japan, a company of Japan
No Drawing. Filed Mar. 13, 1963, Ser. No. 264,769
Claims priority, application Japan, Mar. 15, 1962, 37/10,258
1 Claim. (Cl. 260—256.4)

This invention relates to new and useful improvements in organic acid salts of 4-amino-5-imidazolecarboxamide, the method of making same and the treatment of various diseases therewith.

It has been known that 4-amino-5-imidazolecarboxamide (hereinafter referred to as AICA) is incorporated into animal nucleic acids (especially purine, one of the components), as referred to by C. S. Miller et al., 112 Science 654 (1950), M.P. Schulman et al., 196 J. Biol. Chem. 513 (1952), and further, it has been confirmed that the substance is quantitatively analyzed from human urine and is constantly found present in the living body as noted by A. E. Braunstein et al., 23 Biokhimiya 889 (1958) (U.S.S.R.), P. L. McGeer et al., 39 Can. J. Biochem. Physiol., 591 (1961).

It has been found that AICA possesses the ability to prevent necrosis and stimulate regeneration of the liver parenchymal cells in experimental studies (1) on animals with induced acute and chronic hepatic damages and (2) of both functional and morphological phases of metabolism.

However, AICA per se and its inorganic acid salts are unsuitable for medicinal use. The free base is unstable as it becomes colored gradually. The inorganic acid salts taste sour, and the aqueous solution presents an extremely low pH value, tending to precipitate the free base when adjusted to a pH near 7 at which they would be usable for injection. Thus, neither the oral nor vascular routes are suitable for administration.

It is an object of this invention to provide AICA salts that are stable and can be readily administered to the human body.

It is an additional object to provide AICA salts that preferably enhance the activity of AICA.

It has been found that a drug of excellent value and devoid of the defects outlined hereinbefore can be secured by conversion of AICA into organic acid salts. Such salts occur as chemically stable crystals, are less acidic in taste, and are injectable at the pH of their aqueous solution and, accordingly, are quite suitable for use as a drug.

Any kind of organic acid which is clinically compatible to the body and AICA may be selected to be reacted with AICA. Especially desirable are orotic acid, such aliphatic acids as lactic, succinic, maleic, citric, tartaric, etc. and such sugar acids as gluconic, galactonic, etc., particularly penta and poly, hydroxycarboxylic acids.

It had been known that orotic acid plays a role in the pyrimidine precurser of nucleic acids in the living body and has been used in the treatment of liver diseases and others. However, there is another purine precursor of nucleic acids into which orotic acid cannot be converted. It was also known that orotic acid may produce fatty livers. AICA orotate produced by the present invention contains both the precursors of nucleic acid so that both can be simultaneously administered on an equimolar basis by taking only one compound.

The following table shows the much greater incorporation into ribonucleic acid (RNA) when AICA and orotic acid are concomitantly given intraperitoneally to mice on equimolar basis than when AICA or orotic acid is singly administered respectively.

TABLE I

Specific activity of $C^{14}$-AICA and $C^{14}$-orotic acid incorporated into the liver RNA fraction with high metabolic activity

| Labelled Compound | Additive | Specific Activity CPM/E 260 |
|---|---|---|
| $C^{14}$-AICA | | 93 |
| $C^{14}$-AICA | Orotic acid | 130 |
| $C^{14}$-Orotic acid | | 807 |
| Do | AICA | 1,850 |

The following table shows that fatty livers normally induced by orotic acid are not induced by the administration of AICA or AICA orotate into rats (which were killed on the eleventh day and total fat estimated by the Folch method).

TABLE II

| Grouping and Rate of Drugs Combined | $\frac{\text{Live r wt.}}{\text{Body wt.}} \times 10^3$ | Total Fat Content mg./g. of Liver (Wet wt.) |
|---|---|---|
| Basal diet alone (control) | 42.2±7.3 | 43.48±4.68 |
| Basal diet +1% Orotic acid | 48.8±6.0 | 60.05±5.02 |
| Basal diet +1% AICA | 38.6±7.7 | 42.3 ±3.56 |
| Basal diet +2% AICA orotate | 41.0±7.3 | 39.1 ±5.41 |
| Basal diet +1% Orotic acid 1.5% ACIA | 44.4±6.0 | 40.72±2.27 |

To test acute toxicity, mice of the dd-strain, each weighing 15–20 g. were given a suspension of 0.8–8 w./v. percent AICA orotate in 1% solution in $H_2O$ of sodium carboxymethyl cellulose both intraperitoneally and orally. The $LD_{50}$ value was 0.6 g./kg. by intraperitoneal injection and more than 4.0 g./kg. by oral administration.

To test chronic toxicity, young rats of the Wistar strain, each weighing about 50 g. were given 10 or 100 mg./kg. AICA orotate daily for 3 consecutive months. The animals showed weight gains similar to that noted in the control, with no incidence of toxicity being recognized and no abnormal histological changes noted.

AICA orotate is stable for 3 months at room temperature, 30° C. and 37° C., and 8 hours under reduced pressure of 5 mm. mercury at 90° C. There were no changes in stability following 2 weeks of ultra-violet irradiations (E–272 mu; conc. 10γ/ml.; d–10 mm.)

The AICA organic acid salts of this invention may be formed by reacting AICA with an organic acid, i.e. the free base of AICA is mixed with an organic acid in water or in any hydrophilic organic solvents such as lower aliphatic alcohols, dimethylformamide, etc., or in the mixture of both and, as needed, the mixture is heated to be dissolved and then cooled. Thus the organic acid salt can be immediately obtained in almost pure forms. Another method is to react an AICA inorganic acid salt in aqueous solution with an organic acid metal salt. Rather than use the unstable free base of AICA, an aqueous solution of AICA inorganic acid salt is desalted to produce AICA by basic substance, for example, basic ion-exchange resin or alkali such as alkali metal hydroxide, alkali metal carbonate, aqueous solution of AICA in free base which is then reacted with an organic acid.

There are several known methods for preparation of AICA, among these the method industrially most desirable is to use 2-phenylazo-2-amidino acetic amide as an intermediate. This method includes reduction with a metal (generally) and mineral acid, but a small amount of the metal remains as impurity (which is removable only with difficulty by recrystallization) in the resulting AICA inorganic acid salt (AICA being unstable as the free base, is usually separated as the inorganic acid salt).

Presence of such impurities is undesirable if the AICA is to be a medicament, and the removal thereof with hydrogen sulfide has been considered but found non-feasible because of severe toxicity, and even here, complete removal of the metal is difficult.

If the raw material is AICA inorganic acid salt containing such impurities, the desired ultimate organic salt could be very conveniently obtained, simultaneously with refining, by reaction with an organic acid that forms a relatively insoluble salt in water. Thus, the organic salt may be preferably obtained by the reaction of orotic acid (which gives a relatively insoluble salt in water) with a solution of AICA which was prepared from an AICA inorganic acid salt by addition of alkali as previously described.

The AICA organic acid salt thus obtained is considered to have an ionic linkage of amino radical at the 4th position of AICA and carboxyl residue of organic acid.

If the original organic acid is a polybasic carboxylic acid, the neutral and acidic salts are first obtained, which can be done by adjusting the molecular ratio of the raw material or the volume of the solvent used. However, when the neutral salt and acidic salt have been simultaneously produced, the separation of both may be possible, for instance, by recrystallization.

The AICA organic acid salts are employed for final administration in the various forms such as powder, tablets, injection, etc. with conventional and compatible carriers such as vehicles (lactic acid, starch) disintegrator (ECG), rubricant (magnesium stearate), etc.

The following examples of various AICA organic acid salts and methods of making same are not to be construed as limitations on the invention.

EXAMPLE 1

10.0 g. of 4-amino-5-imidazolecarboxamide (monohydrate) and 5.2 g. of tartaric acid were dissolved with heating in 50 cc. of water. The solution was decolorized with Norit, cooled and then filtered off. 11.3 g. of a white crystalline neutral salt (dihydrate) of 4-amino-5-imidazolecarboxamide with tartaric acid, M.P. 196–197° C. (decomp.) was obtained.

Calculated: C, 32.87; H, 5.09; N, 25.56. Found: C, 33.21; H, 5.37; N, 25.97 ($C_{12}H_{18}O_8N_8 \cdot 2H_2O$).

EXAMPLE 2

10.0 g. of 4-amino-5-imidazolecarboxamide (monohydrate) was treated with 4.1 g. of succinic acid as in Example 1 to obtain 11.3 g. of white crystalline neutral salt with M.P. 184–185° C. (decomp.).

Calculated: C, 38.91; H, 4.90; N, 30.25. Found: C, 39.02; H, 5.25; N, 29.83 ($C_{12}H_{18}O_6N_8$).

EXAMPLE 3

5.0 g. of 4-amino-5-imidazolecarboxamide (monohydrate) was treated with 5.2 g. of tartaric acid as in Example 1 to obtain 6.1 g. of acidic salt with M.P. 214–215° C. (decomp.).

Calculated: C, 32.66; H, 4.80; N, 19.04. Found: C, 32.81; H, 4.99; N, 19.48 ($C_8H_{12}O_7N_4 \cdot H_2O$).

EXAMPLE 4

5.0 g. of 4-amino-5-imidazolecarboxamide (monohydrate) was treated with 4.1 g. of succinic acid as in Example 1 to obtain 5.9 g. of acidic salt with M.P. 194–195° C. (decomp.).

Calculated: C, 39.34; H, 4.95; N, 22.96. Found: C, 39.78; H, 5.17; N, 23.22 ($C_8H_{12}O_5N_4$).

EXAMPLE 5

14.4 g. of 4-amino-5-imidazolecarboxamide (monohydrate) and 17.4 g. of orotic acid (monohydrate) were dissolved with heating in 600 cc. of water. The solution is decolorized with Norit, cooled and then filtered off. 28.8 g. of a white crystalline salt (dihydrate) is obtained with M.P. 284° C. (decomp.), and having the following formula:

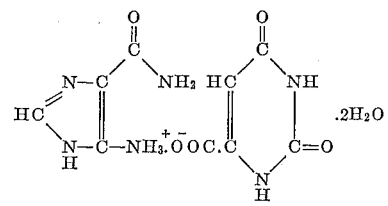

Calculated: C, 33.96; H, 4.43; N, 26.41. Found: C, 33.98; H, 4.51; N, 26.75 ($C_9H_{10}O_5N_6 \cdot 2H_2O$).

EXAMPLE 6

16.3 g. of 4-amino-5-imidazolecarboxamide hydrochloride and 17.8 g. of sodium orotate was treated as in Example 5 to obtain 28.5 g. of a white crystalline salt (dihydrate) with M.P. 285° C. (decomp.).

EXAMPLE 7

1 g. of sodium hydrogen sulfite is added to 36 l. of hot water (at 75°–85° C.). 498 g. of 4-amino-5-imidazolecarboxamide hydrochloride containing zinc chloride as impurity is dissolved in the above solution, having a pH of 2.4–2.6 which is adjusted to pH 5 by adding 156 g. of sodium carbonate anhydride, taking care not to produce foaming. In the solution thus obtained is dissolved 516 g. of orotic acid at 75–85° C. The resulting solution is treated with 50 g. of charcoal, filtered by suction, cooled slowly and allowed to stand overnight at temperature below 30° C. The product is isolated by filtration, washed with water and then dried. The yield of crystalline salt (dihydrate) of 4-amino-5-imidizolecarboxamide with orotic acid is about 780 g. (80%) and is free of zinc chloride. The content of zinc chloride in the AICA and salt obtained and the yield of salt are listed in the following table for several tests.

TABLE III

| No. | ZnCl$_2$ as percent Zn | | Percent Yield |
|---|---|---|---|
| | AICA | End | |
| 1 | 0.005 | 0 | 81.5 |
| 2 | 0.007 | 0 | 83.6 |
| 3 | 0.010 | 0 | 78.5 |
| 4 | 0.015 | 0 | 77.0 |
| 5 | 0.004 | 0 | 78.0 |
| 6 | 0.006 | 0 | 82.1 |

We claim:

The orotic acid salt of 4(or 5)-amino-5(or 4)-imidazolecarboxamide.

(References on following page)

References Cited by the Examiner

UNITED STATES PATENTS

| | | | |
|---|---|---|---|
| 2,756,228 | 7/1956 | Hitchins et al. | 260—309 |
| 2,780,577 | 2/1957 | Phillips et al. | 167—65 |
| 2,890,982 | 6/1959 | Natt | 167—65 |
| 2,897,205 | 7/1959 | Leanza | 260—309 |
| 2,926,172 | 2/1960 | Boehme et al. | 260—563 |
| 2,944,061 | 7/1960 | Jacob et al. | 260—309 |
| 3,010,972 | 11/1961 | Kaiser et al. | 260—563 |
| 3,062,722 | 11/1962 | Garofalo | 260—256.4 |
| 3,117,128 | 1/1964 | Mooradian et al. | 260—294.3 |

FOREIGN PATENTS

| | | |
|---|---|---|
| 37/1,295 | 4/1962 | Japan. |
| 37/4,241 | 6/1962 | Japan. |
| 37/4,242 | 6/1962 | Japan. |

OTHER REFERENCES

Chemical Abstracts, vol. 58, Subject Index (A–I), page 1131S, first column.

Gots Nature, vol. 172, pages 256–57 (1953).

Hofmann: Imidazole and Its Derivatives, part I, pages 179–84 (vol. 6 of the Chemistry of Heterocyclic Compounds), New York, Interscience, 1953.

Miller et al.: Science, vol. 112, pages 654–55 (1950).

Nakatami: Jour. Pharm. Soc. of Japan, vol. 83, pages 6–9 (January 1963).

WALTER A. MODANCE, *Primary Examiner.*

NICHOLAS RIZZO, *Examiner.*

NATALIE TROUSOF, *Assistant Examiner.*